United States Patent
Le Pallec et al.

(10) Patent No.: US 9,300,422 B2
(45) Date of Patent: Mar. 29, 2016

(54) METHOD FOR DETECTING A SYNCHRONIZATION FAILURE OF A TRANSPARENT CLOCK AND RELATED PROTECTION SCHEMES

(75) Inventors: Michel Le Pallec, Nozay (FR); Dinh Thai Bui, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 748 days.

(21) Appl. No.: 13/509,459

(22) PCT Filed: Feb. 9, 2011

(86) PCT No.: PCT/EP2011/051864
§ 371 (c)(1),
(2), (4) Date: Jul. 31, 2012

(87) PCT Pub. No.: WO2011/098466
PCT Pub. Date: Aug. 18, 2011

(65) Prior Publication Data
US 2012/0307845 A1  Dec. 6, 2012

(30) Foreign Application Priority Data
Feb. 10, 2010 (EP) ..................................... 10153237

(51) Int. Cl.
*H04J 3/14* (2006.01)
*H04J 3/06* (2006.01)

(52) U.S. Cl.
CPC .............. *H04J 3/14* (2013.01); *H04J 3/0661* (2013.01); *H04J 3/0673* (2013.01); *H04J 3/0641* (2013.01)

(58) Field of Classification Search
None
See application file for complete search history.

(56) References Cited

U.S. PATENT DOCUMENTS 6,414,959 B1 * 7/2002 Asano ........................... 370/397
2002/0156612 A1  10/2002 Schulter et al.
(Continued)

FOREIGN PATENT DOCUMENTS

CN  101114942 A  1/2008
CN  101124566 A  2/2008
(Continued)

OTHER PUBLICATIONS

Meier, S. et al., "IEEE 1588 applied in the environment of high availability LANs", Information Sciences and Systems, 2007. CISS '07. 41ST Annual Conference on IEEE, PI, Oct. 1, 2007. pp. 100-104, XP031161286, ISBN: 978-1-4244-1063-7, the whole document.
(Continued)

*Primary Examiner* — Chirag Shah
*Assistant Examiner* — Joshua Smith
(74) *Attorney, Agent, or Firm* — Harness, Dickey & Pierce, P.L.C.

(57) ABSTRACT

The method for detecting and managing a synchronization failure of a transparent clock is used in a packet network in order to determine and correct residence time of time-stamped packets within a traversed element of said network. The transparent clock is part of a Master/Slave synchronization path including a plurality of network elements and their associated transparent clocks. The method includes transmitting time-stamped packets from the Master to the Slave through different synchronization paths in order to have the Slave receiving multiple time signals transmitted through different paths, and determining a failure within a transparent clock of a failed/failing synchronization path if the time signal provided by said failed/failing path differs from the time signal provided by the other transmitting path(s).

9 Claims, 2 Drawing Sheets

(56) References Cited

U.S. PATENT DOCUMENTS

Figure 1:
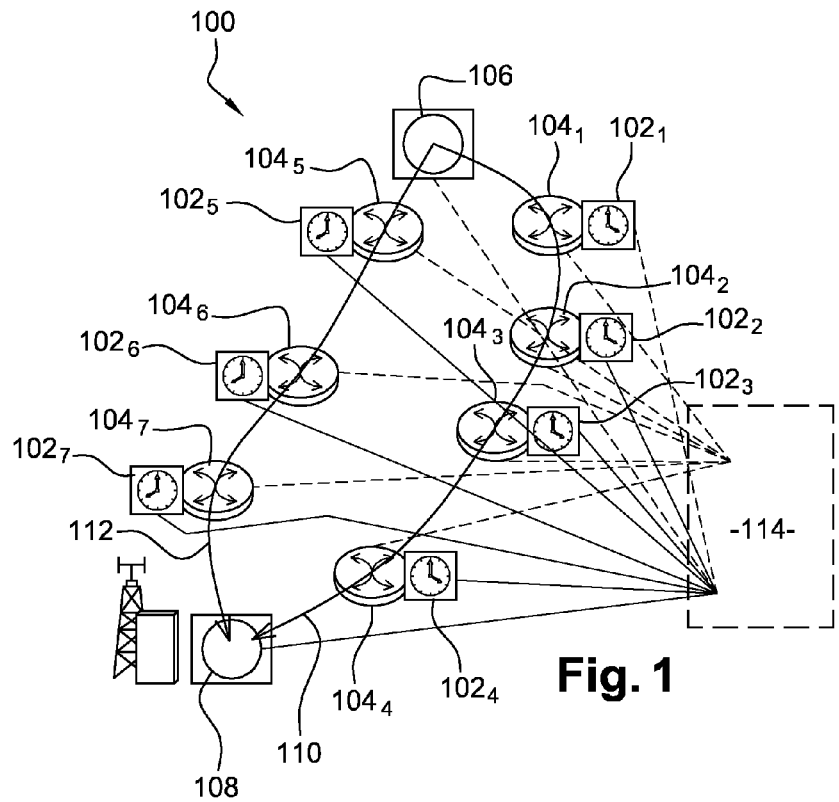

| | | | |
|---|---|---|---|
| 2002/0156893 A1* | 10/2002 | Pouyoul et al. | 709/225 |
| 2003/0110408 A1* | 6/2003 | Wells et al. | 714/1 |
| 2008/0209505 A1 | 8/2008 | Ghai et al. | |
| 2008/0225897 A1* | 9/2008 | Bryant et al. | 370/503 |
| 2010/0020787 A1* | 1/2010 | Ji et al. | 370/351 |
| 2010/0085990 A1* | 4/2010 | Belhadj et al. | 370/517 |
| 2011/0026410 A1* | 2/2011 | Meloche | 370/244 |

FOREIGN PATENT DOCUMENTS

| | | |
|---|---|---|
| CN | 100450227 C | 1/2009 |
| CN | 101523812 A | 9/2009 |
| WO | WO-0239630 A2 | 5/2002 |

OTHER PUBLICATIONS

Bui, D.T. et al., "Packet delay variation management for a better IEEE1588V2 performance", Precision Clock Synchronization for Measurement. Control and Communication, 2009. ISPCS 2009. International Symposium on, IEEE, Piscataway. NJ, USA, Oct. 12, 2009. pp. 1-6, XP031570876, ISBN: 978-1-4244-4391-8, the whole document.

International Search Report.

Written Opinion of the International Searching Authority.

IEEE Standard for a Precision Clock Synchronization Protocol for Network Measurement and Control Systems, IEEE Instrumentation and Measurement Society, Standard No. IEEE STD 1588 (2008) IEEE, USA IEEE New York, NY, USA, Jul. 24, 2008, XP002588173.

* cited by examiner

METHOD FOR DETECTING A SYNCHRONIZATION FAILURE OF A TRANSPARENT CLOCK AND RELATED PROTECTION SCHEMES

The invention relates to a method for detecting a synchronization failure of a transparent clock with related protection schemes.

It is known to implement in a packet telecommunication network specific devices—called thereafter transparent clock—aiming at taking into account network elements residence times—i.e. delays for a packet to be transmitted through such network elements.

For that purpose, transparent clocks are associated to respective network elements—e.g. routers or switches—along a communication path between a master server and a client, called thereafter respectively as "Master" and "Slave", the former transmitting time-stamped packets to the latter along said communication path. In this document, such time-stamped packets also called "time control packets" or "control packets".

On the basis of time control packets, transparent clocks can measure and correct traversed network element residence times (end-to-end transparent clocks) or both link delays and network element residence times (peer-to-peer transparent clock).

As an example of method implementing transparent clock and time control packets, the standard IEEE 1588V2, also called Precision Time Protocol release $2^{nd}$ version or PTPV2, of the Institute of Electrical and Electronics Engineers (IEEE) can be considered.

Within a full transparent clock deployment—i.e. whereby all the elements dealing with one packet from the Master to the Server are associated to a transparent clock, transparent clock operations are impacted when they fail to maintain a correctly synchronized frequency and/or time between the Master and the Slave. Thus, corrective and proactive actions are required to deal with transparent clock failures.

If a failure is internally detected by a failed/failing transparent clock itself, corrective/proactive operations can be performed by having the failed/failing part of the transparent clock being automatically replaced by an internal backup part and/or by having the failed/falling transparent clock sending a "FAULT" message to a remote synchronization manager which can set-up a backup synchronization path.

Disappointingly, these approaches require the provisioning of internal transparent clock redundancies and switching procedures—which increase the cost of the transparent clock—and/or a significant reconfiguration times as the synchronization manager is generally a remote element usually located in a central office at the network core level.

Such significant reconfiguration times imply further Slave requirements (e.g. frequency stability, phase transients filtering) and thus an additional cost thereof.

If a failure is not internally detected by the failed/failing transparent clock itself, a reference clock might be used to control the transparent clock frequency deviation. This reference clock could be embedded either locally—i.e. either within the transparent clock or within an associated network element—or in an external synchronization signal, such as a retimed bit stream.

In this case, a locking system might be able to detect any deviation between the frequency carried by the retimed signal and the frequency generated by the local oscillator of the transparent clock.

Disappointingly, these methods also required additional costs, for instance in hardware element such as a Phase Locked Loop.

In order to solve the previously indicated drawbacks of prior art, the invention provides at least one method for detecting a transparent clock failure and related protection mechanisms within an acceptable cost scheme, either in the framework of internally detected failures (e.g. a port failure) and/or in the framework of externally detected failures.

For that purpose, the present invention relates to a method for detecting and managing a synchronization failure of a transparent clock used in a packet network in order to determine and correct residence time of time-stamped packets within a traversed element of said network, the transparent clock being part of a Master/Slave synchronization path comprising a plurality of network elements and their associated transparent clocks, wherein it comprises the following steps:

The step of transmitting time-stamped packets from the Master to the Slave through different synchronization paths in order to have the Slave receiving multiple time signals transmitted through different paths, and The step of determining a failure within a transparent clock of a failed/failing synchronization path if the time signal provided by said failed/failing path differs from the time signal provided by the other transmitting path(s).

When implementing the invention into a communication packet network, an efficient automated protection mechanism of the synchronization topology is achieved while considering relatively poor transparent clock and/or Slave requirements in term of frequency stability. In other words, the invention is cost-efficient.

As an illustration, the invention provides a very short reconfiguration time at the Slave level which allows for significantly relaxing the stability requirements of the Slave clock and thus its cost.

Finally, a back-up path approach monitored by a Slave according to the invention avoids a redundancy scheme implying multiple transparent clocks.

Thus, the invention delivers the required protection requirements of a transparent clock taking advantage of the synchronization topology in a cost-efficient way.

In one embodiment, the method further comprises the step of having the Slave requesting, to the Master and/or to a synchronization management server, the set-up of Ia new synchronization path in addition to said different synchronization paths in order to determine the failure within a transparent clock of a failing synchronization path.

In one embodiment, the invention further comprises the step for the Slave to transmit the detected failure to the synchronization management server.

In one embodiment, the invention further comprises the step for the failed transparent clock to transmit the detected failure to the synchronization management server.

In one embodiment, the invention further comprises the step for the synchronization management server to replace the failed synchronization path by a pre-provisioned or a newly established synchronization path.

In one embodiment, a transparent clock status descriptor is embedded in time stamped packets so that a transparent clock indicates to the Slave an internal failure within said time stamped packets.

In one embodiment, the transparent clock status is indicated in a new Type Length Value (TLV) like descriptor transported within a PTPv2 message.

In one embodiment, the new Type Length Value like descriptor contains a counter which is modified at each traversed non failed transparent clock.

In one embodiment, the new Type Length Value like descriptor allows for determining the failed transparent clock within the synchronization path.

The invention also relates to a Slave, aimed to detect and manage a synchronization failure of a transparent clock used in a packet network in order to determine and correct a residence time of time-stamped packets through an element of said network, the transparent clock being part of a Master/Slave synchronization path comprising a plurality of network elements and their associated transparent clocks, characterized in that it comprises the following means:

Means for receiving time-stamped packets transmitted from the Master through different synchronization paths in order to have multiple time signals transmitted through different paths, and Means for determining a failure within a transparent clock of the failing synchronization path if the time signal provided by said failing path differs from the time signal provided by the other transmitting path(s).

Figure 2:
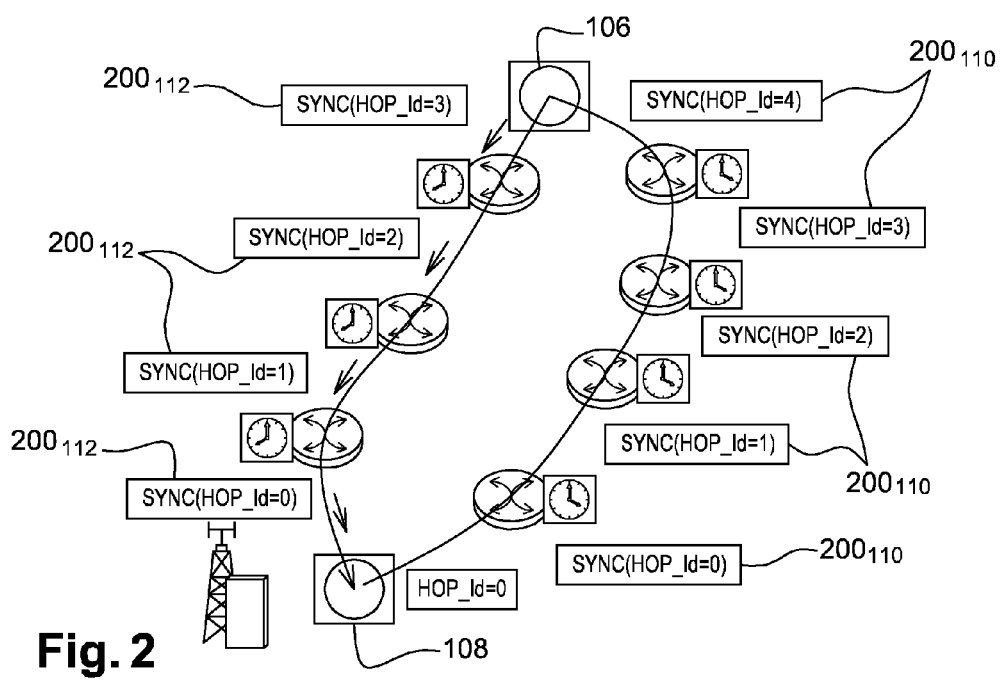
Figure 3:
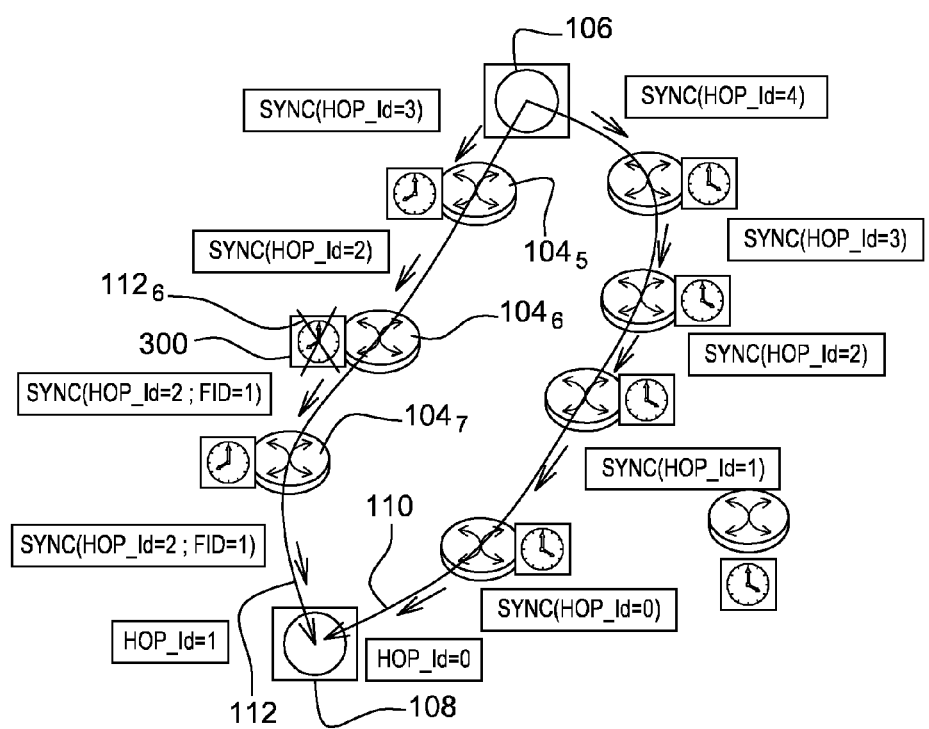

Reference will now be made in detail to the present preferred embodiment of the invention, an example of which is illustrated in the accompanying figures wherein:

FIG. 1 represents a packet network implementing a method according to the invention, FIG. 2 represents the packet network of FIG. 1 wherein transparent clocks operate correctly, and FIG. 3 represents the packet network of FIG. 1 wherein a transparent clock presents a failure.

In reference to FIG. 1, a packet network 100 comprises transparent clocks $102_1, 102_2, \ldots, 102_7$ in order to determine and correct the transmission delay of data packets through elements $104_1, 104_2, \ldots 104_7$ of said network 100.

More precisely each network element $104_i$ is associated to a transparent clock $102_i$ whose function mainly consists in measuring the network element resident time of time-stamped packets transmitted between a Master 106 and a Slave 108 through at least one path 110 or 112.

In this embodiment, said control packets and pair of Master 106/Slave 108 operate accordingly to the IEEE 1588V2 protocol already mentioned.

Transparent clocks $102_1, 102_2, \ldots 102_7$ operations, according to said protocol IEEE 1588V2, are dedicated to fight out the packet jitter—i.e. the Packet Delay Variations (PDVs)—within the network 100 as well as the PDV-induced communication path delay asymmetry, often mentioned as "network noise", whereby the communication delay of one PTPV2 message in one direction (e.g. from Master 106 to Slave 108) significantly differs from the delay of a related PTPV2 message (i.e. with the same sequence number) in the opposite direction (e.g. from Slave 108 to Master 106), which is inherent to PSNs ("two-ways" approach).

Considering a fully deployed transparent clock scheme, a one-way time signaling is sufficient, from the Master to the Slave, for achieving stringent synchronization requirement at the Slave level.

Thus, without transparent clock, the PTPV2 performance is very dependent on the network 100 traffic load which is by nature unpredictable. In order to overcome transparent clock failures in an efficient way, each transparent clock implements the first and/or the second aspect of the invention described herein below since each aspect might be used independently from each other:

According to a first aspect of the invention dealing with non detected failure by the failed/failing transparent clock itself, control packets are transmitted from the Master 106 to the Slave 108 through different synchronization paths 110 and 112 so that the Slave 108 can obtain multiple time signals transmitted through said different paths 110 and 112.

Thus, the Slave can conclude to a failure event within a transparent clock of one synchronization path if the time signal provided by said path significantly differs from the others as described thereafter.

In case the Slave 108 performs such failure detection, the Slave 108 transmits a detected failure to a synchronization manager 114 of the network so that, for instance, said synchronization manager establishes a new synchronization path in order to determine, or isolate, the failed/failing synchronization path.

According to this first aspect of the invention, the Slave 108 has the ability to compare the time signals computed from information provided by respective path(s) so that, if the time provided by one path starts to strongly diverge—on the basis of a time offset threshold—from the same/similar time provided by the other paths, then the slave server 108 can conclude that said diverging path is failed/failing.

In the particular case where there are only two redundant paths as in FIG. 1, the Slave 108 might not be able to isolate the faulty path. It can however send an "Alarm" message to the synchronization manager 114 which can then take appropriate action to set-up a 3rd synchronization path which is required to detect and eventually replace the faulty path.

On the basis of said 3rd path, the Slave 108 can isolate the failed/failing path and thus can have it torn down (e.g. by the network management system).

This aspect of the invention should particularly be applied in the case of a slow transparent clock degradation—e.g. such as an early aging of the local oscillator—not detected by the transparent clock itself.

The detection mechanism of slow synchronization path failures due to a transparent clock or other still allows for using "light" (ie low-cost) clocks for the slave, as these latter don't have to embed a local stable (and expensive) frequency reference.

Moreover the local transparent clock redundancy approach could then be avoided thanks to a back-up synchronization path approach. This significantly relaxes the protection constraints of such elements and therefore the cost.

Moreover, maintenance of multiple failing transparent clocks can be improved since such maintenance can be coordinated for failing transparent clocks which have precisely been identified.

In the same way, this protection sequence significantly relaxes the Slave clock requirements (holdover/filtering stage, etc) and thus the Slave cost.

In another embodiment of this first aspect of the invention whereby a failed/failing transparent clock detects its failure by itself, said failed/failing transparent clock can, in parallel or alternatively to the Slave 108, transmit the failure event alarm to the synchronization manager 114 of the network.

According to the second aspect of the invention, a transparent clock status descriptor is embedded in the control packets (time-stamped packets) so that a transparent clock can reveal to the Slave an internal failure through said control packets (by an absence of action).

In the context of PTPv2 message, transparent clock status might be a Type Length Value field transported within control messages.

In reference to FIG. 2, such descriptor 200 is a value "Id" decremented by 1 by each traversed non failed/failing transparent clock. Thus, the value of the descriptor represents, at the Master 106 level, the total number of transparent clocks deployed along the considered Master/Slave communication path.

During normal operations, the descriptor value should be equal to zero at the Slave level.

On the contrary, a non-null value indicates to the Slave 108 a failure event 300 (FIG. 3) occurring on the related synchronization path.

As an extension, the descriptor might comprise, as in this embodiment, a—"Transparent Clock failed indicator—FID", for instance a one bit of a synchronization message, which allows for pointing out the failing transparent clock $102_6$ within the synchronization path.

In case of failure, the nth transparent clock changes the FID status (typically a Boolean value) in order to prevent other subsequent transparent nodes decrementing the Id status. Consequently the Id value received at the slave level provides the position of the failed slave clock within the Master/slave communication path.

The different aspects of the invention particularly cover the mobile network application demonstrating stringent frequency and time requirements (microsecond accuracy) at the slave level. A full Transparent Clock deployment is one viable approach for addressing such an issue.

Considering a synchronization network path of 10 nodes with a worst PDV case for each node—about 10 ms—(that can occur in congestion conditions) and targeting a microsecond time accuracy requirement at the slave level, it appears that the accuracy required by the transparent clock should be at least in the 1 ppm (part per million) range.

For such a value, the maximum cumulated time correction error, in the 100 ns range, is then far below the µs target. Thus, transparent clock measurement requirements are achievable with low-cost oscillators.

It should be underlined that the frequency accuracy requirement (mandatory for a large set of wireless technologies) could be met by a single derivation of the time information. Indeed, the time measurement error could be reduced, for instance, by integrating the time information over a given number N of IEEE 1588V2 packets so that the error/noise is then corrected by a $(N)^{-1/2}$ ratio (more generally, filtering techniques can be used as well).

Considering a standard 1588V2 packet/message rate of 16 packets per second, the time measurement error is reduced by a factor of 4 after 1 second. A 100 ns cumulated error becomes thus an error of 25 ns over 1 s, leading to a 25 ppb (part per billion) frequency accuracy value. Thus stringent time and frequency requirements are achievable with 1588V2 slave clock demonstrating poor (frequency) stability/accuracy features.

As mentioned, this proposal assumes a TC implemented on every NE within the PSN but, depending on the embodiments, this "full deployment" implementation might not be required.

The invention might be derived according to different embodiments. As an illustration, multiple paths monitoring of the first aspect of the invention might allow for a load balancing of sent synchronization messages from the Master to the Slave. (e.g. odd sequence Sync messages sent over path 1 and even sequence Sync messages sent over path 2).

The invention claimed is:

1. A method for detecting and managing a synchronization failure of a transparent clock used in a packet network in order to determine and correct residence time of time-stamped packets within a traversed element of said network, the transparent clock being part of a synchronization path between a Master and a Slave, a plurality of network elements and associated transparent clocks being present along the synchronization path, the method comprising:

transmitting time-stamped packets from the Master to the Slave through different synchronization paths in order to have the Slave receive multiple time-stamped packets transmitted through the different synchronization paths, determining a failure within a transparent clock of a failed or failing synchronization path if one of the multiple time-stamped packets provided by said failed or failing synchronization path differs from remaining ones of the multiple time-stamped packets provided by other ones of the different synchronization paths based on a time offset threshold, configuring the Slave to request the Master or a synchronization management server to set-up of a new synchronization path in addition to said different synchronization paths, and isolating the failure within the transparent clock of said failed or failing synchronization path based on said new synchronization path.

2. The method according to claim 1, further comprising: transmitting the failure, by the Slave, to the synchronization management server.

3. The method according to claim 1, further comprising: transmitting, for the failed or failing transparent clock, the failure to the synchronization management server.

4. The method according to claim 1, wherein the synchronization management server replaces the failed or failing synchronization path by a pre-provisioned or a newly established synchronization path.

5. The method according to claim 1, wherein a transparent clock status descriptor is embedded in the time stamped packets so that the transparent clock indicates to the Slave an internal failure within said time stamped packets.

6. The method according to claim 5, wherein a transparent clock status is indicated in a new Type Length Value (TLV) descriptor transported within a Precision Time Protocol 2nd Version (PTPv2) message.

7. The method according to claim 6, wherein the new TLV descriptor includes a counter which is modified at each traversed transparent clock which is not a failed or failing transparent clock.

8. The method according to claim 6, wherein the new TLV descriptor allows for determining the failure within transparent clock.

9. A Slave for detecting and managing a synchronization failure of a transparent clock used in a packet network in order to determine and correct a residence time of time-stamped packets through an element of said network, the transparent clock being part of a synchronization path between a Master and the Slave, a plurality of network elements and associated transparent clocks being present along the synchronization path, the Slave comprising:

a memory having computer readable instructions stored therein, and a processor configured to execute the computer-readable instructions to, receive the time-stamped packets transmitted from the Master through different synchronization paths in order to have multiple time-stamped packets transmitted through the different synchronization paths, determine a failure within a transparent clock of a failed or failing synchronization path if one of the multiple time-stamped packets provided by said failed or failing synchronization path differs from remaining ones of the multiple time-stamped packets provided by other ones of the different synchronization paths based on a time offset threshold, request the Master or a synchronization management
server to set-up a new synchronization path in addition to said different synchronization paths, and
isolate the failure within the transparent clock of said failed or failing synchronization path based on said new synchronization path.

\* \* \* \* \*